United States Patent [19]

Booher

[11] Patent Number: 4,861,067

[45] Date of Patent: Aug. 29, 1989

[54] ACTIVE VEHICLE SUSPENSION WITH COMPOSITE CONTROL ARM

[75] Inventor: Benjamin V. Booher, Leucadia, Calif.

[73] Assignee: Suspension Group, Ltd., Encinitas, Calif.

[21] Appl. No.: 77,398

[22] Filed: Jul. 24, 1987

Related U.S. Application Data

[63] Continuation-in-part of Ser. No. 835,187, Mar. 3, 1986, abandoned, which is a continuation-in-part of Ser. No. 717,791, Mar. 29, 1985, abandoned, which is a continuation-in-part of Ser. No. 525,011, Aug. 22, 1983, Pat. No. 4,509,774.

[51] Int. Cl.$^4$ .............................................. B60G 17/00
[52] U.S. Cl. .................................... 280/707; 280/669
[58] Field of Search ............... 280/688, 669, 718, 663, 280/665, 673, 694, 707, 711, 719; 267/229, 241, 47, 36.1, 148, 149

[56] References Cited

U.S. PATENT DOCUMENTS 4,105,216 8/1978 Graham et al. ..................... 280/707
4,557,500 12/1985 Collard et al. ...................... 280/719
4,616,847 10/1986 Kanai et al. .......................... 280/707
4,616,848 10/1986 Sugasawa et al. .................. 280/707

OTHER PUBLICATIONS

SAE Paper No. 680,750, entitled "Some Fundamental Limitations of Active and Passive Vehicle-Suspension Systems" by Erich K. Bender pp. 2910-2915.
SAE Paper No. 800, 520, entitled "An Optimal Linear Active Suspension with Finite Road Preview", by A. G. Thompson et al., 15 pages.

Primary Examiner—Richard A. Bertsch
Attorney, Agent, or Firm—Baker, Maxham, Jester & Meador

[57] ABSTRACT

A vehicle suspension system which includes a passive spring system including composite control arms for normal support of the vehicle for normal load, road and handling conditions and an active system responseive to deviations from normal conditions for support of the vehicle for abnormal load, road and handling conditions.

17 Claims, 1 Drawing Sheet

ACTIVE VEHICLE SUSPENSION WITH COMPOSITE CONTROL ARM

REFERENCE TO RELATED APPLICATIONS

This application is a Continuation-in-Part of my co-pending U.S. application Ser. No. 835,187, filed Mar. 3, 1986 entitled "Vehicle Suspension System with Flexible Control Arm", now abandoned which is a Continuation-in-Part of my co-pending U.S. application No. 717,791, filed Mar. 29, 1985 entitled "Vehicle Suspension System with Flexible Control Arm", now abandoned which is in turn a Continuation of my earlier U.S. patent application Ser. No. 525,011, filed Aug. 22, 1983 entitled "Composite Control Arm Apparatus" now U.S. Pat. No. 4,509,774, granted Apr. 9, 1985.

BACKGROUND OF THE INVENTION

The present application relates to vehicle suspension systems and pertains particularly to a combination passive and active vehicle suspension system.

Until recent years most vehicle suspension systems have been what may be termed passive systems. The term passive system as used herein is intended to mean a system in which the spring and damping of the system cannot be varied in response to changing conditions. These systems employed a combination of fixed rate springs and fixed resistance dampers for controlling the ride of the vehicle.

In recent years active or dynamic systems having variable rate dampers with sensing systems for varying the stiffness of the dampers in response to road conditions have been developed. Other systems have employed variable stiffness springs along with variable dampers for controlling the vehicle body height on the wheels and the ride. The terms active or dynamic systems as used herein are intended to refer to a system having one or more of the components, such as spring or damper variable in response to changing load or road conditions.

These variable systems use various types of sensors, including road preview sensors that have been proposed and developed for these systems. For example, SAE Technical Paper Ser. Nos. 630,750 and 800,520, respectively published on Oct., 1968 and Feb., 1980 show road preview sensors for use in suspension systems for obtaining optimum riding comfort and drivability. In addition, Japanese Patent First Publication No. 57-172808, published on Oct. 23, 1982 discloses a vehicle height control system which detects rough road conditions and adjusts the vehicle height level depending upon road surface conditions. Many of the more sophisticated systems are briefly discussed in an article in the June 1986 issue of High Technology at pages 20 and 21.

A vehicle height or level sensor is employed in some vehicle height control systems for monitoring the relative displacement between the vehicle body and wheel axle. The output of the vehicle level sensor is compared with a reference level, which serves as a rough road criterion, and adjusts the vehicle height according to the result of judgment of the road surface conditions.

In another example, Japanese Patent First Publication No. 58-30542, published on Feb. 23, 1983, discloses a variable damping force shock absorber with damping characteristics varying in accordance with vehicle, driving conditions. In U.S. Pat. 4,616,848 granted Oct. 14, 1986, a system is disclosed wherein, the magnitude of relative displacement between the vehicle body and wheel axle is measured, and a vehicle height variation indicative signal is derived from the measured displacement and the instantaneous vehicle speed. The vehicle height variation indicative signal value is compared with a reference value, which serves as a stiff suspension criterion for adjustment of the damping characteristics of the shock absorber in accordance therewith.

Such road sensors or preview sensors are effective for detecting road surface conditions and controlling damping characteristics of the vehicular suspension for providing both riding comfort and driving stability. On the other hand, as is well known, when the vehicle is driven in substantially low speed, pitching motion of the vehicle significantly degrades riding comfort. Likewise, when the vehicle speed is substantially high, harshness level of the suspension increases due to vibration of the road wheels if the damping force is not enough. Therefore, in such speed range, harder suspension is preferable for preventing pitching motion in substantially low vehicle speed and reducing harshness level in substantially high vehicle speed. Alternatively, when the vehicle speed is in between the substantially low and high speeds, and thus within the normal speed range, e.g. 30 km/h to 80 km/h, hard suspension will give rough ride, failing to degrade driving comfort.

These systems, as described above, are typically in constant operation when the vehicle is in operation. They generally utilize hydraulic or air pumps driven by the engine, and some form of sophisticated sensors for sensing various road and load conditions, and providing input for controlling stiffness and other characteristics of the of the springs and or dampers of the system. While they provide desirable ride characteristics, they are highly complicated and expensive, and use up considerable amounts of power from the vehicle. Therefore, they may be satisfactory for high powered expensive vehicles, but are not seen as a satisfactory alternative in providing both riding comfort and driving stability for economical vehicles where weight and power is a consideration.

SUMMARY AND OBJECTS OF THE INVENTION

It is, therefore, the primary object of the present invention to provide an improved vehicle suspension system.

In accordance with the primary aspect of the present invention, a suspension system for a vehicle includes a first spring system of passive springs for supporting the vehicle body under normal conditions, and a second vehicle spring system of variable springs and dampers that are responsive to sensing means for controlling the suspension system in response to variations in road and other conditions from a norm.

BRIEF DESCRIPTION OF THE DRAWING

The above and other objects and advantages of the present invention will become apparent from the following description when read in conjunction with the accompanying drawings wherein.

DETAILED DESCRIPTION OF A PREFERRED EMBODIMENT

Figure 1:
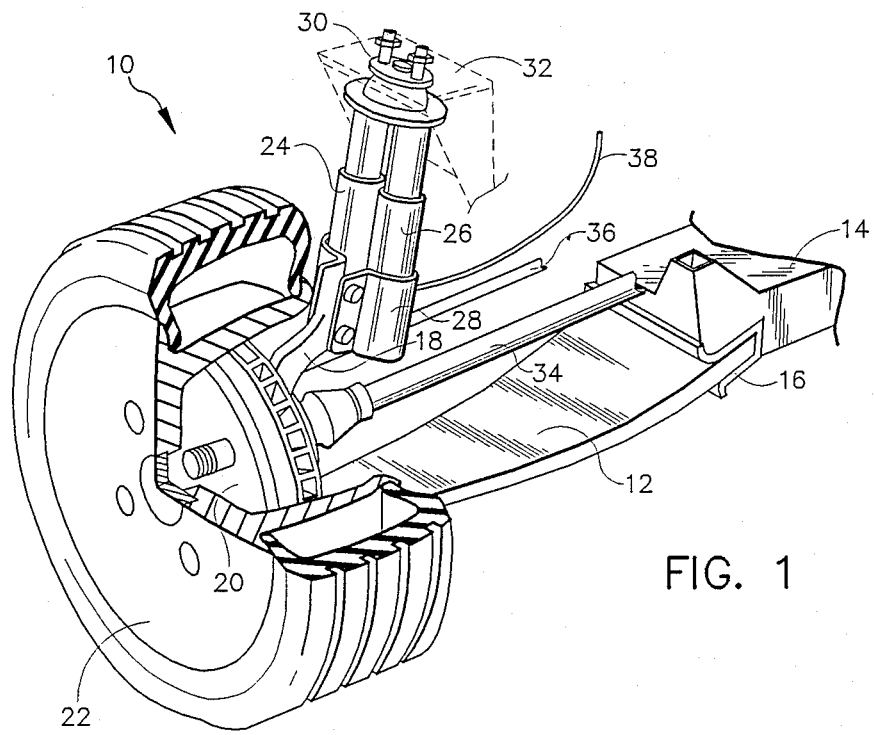
FIG. 1 is a perspective view with portions cut away to illustrate the major components of a system in accordance with the invention.

Referring to FIG. 1 of the drawing, there is illustrated one wheel assembly and a suspension assembly for a vehicle in accordance with the present invention, designated generally by the numeral 10. The overall system comprises a combination of first or passive spring portion or system and an active or variable spring system. The passive system includes a fixed rate spring comprising an arm 12 of a composite construction, such as more particularly described in my U.S. Pat. No. 4,509,774, which is incorporated herein by reference as though fully set forth, and my aforementioned applications. This composite arm 12 comprises a support arm as well as a passive spring portion of the suspension system, with the passive spring unit providing a first portion of the suspension, preferably on the order of about sufficient for normal road and riding conditions. The passive spring unit comprises an arm or beam member 12 that is mounted at an inner end in a central mount unit 14 on the chassis of the vehicle and within a bracket 16. The outer end of the arm 12 includes means not shown for mounting the wheel unit and includes suitable hub and bracket portions 18 in which a hub 20 for mounting a wheel 22 is mounted. The arm 12 defines a non-adjustable spring that serves as the basic or primary spring support for the vehicle for normal conditions. The arm also serves as a control arm for the wheel assembly as described in prior applications.

A second or active spring system includes the combination of a damper unit and a spring unit 24 and 26, which are connected at a lower end by bracket means 28 to the wheel hub assembly, and at an upper end by means of suitable bracket means 30, and ball joint or socket means to a vehicle mount 32. The spring unit 26 is a variable rate spring, such as an air spring that supports a second or secondary portion of the vehicle weight. In a preferred configuration, the fixed spring 12 supports the vehicle for normal road and load conditions. The variable rate spring 26 comes into action to support the vehicle under excess load conditions and under unusual road and handling conditions. The active or variable rate spring and damper may or may not be separate systems, as known technology can provide both functions from a single unit. The unit may be air, hydraulic or electronic in nature. An electronic spring would be similar to a linear electric motor with electronic control of the strength and direction of the magnetic field.

The wheel assembly, as illustrated in FIG. 1, is a front wheel, including a drive shaft 34 and a steering link 36. The lower portion of the wheel assembly is supported and guided by the arm 12. The upper portion of the wheel assembly is guided and supported by the combination of the spring and the damper units 24 and 26. The active spring and damper units may also include sensing units not shown, such as pressure sensing units connected such as by a line 38 connected to a microprocessor or the like as will be further explained.

Figure 2:
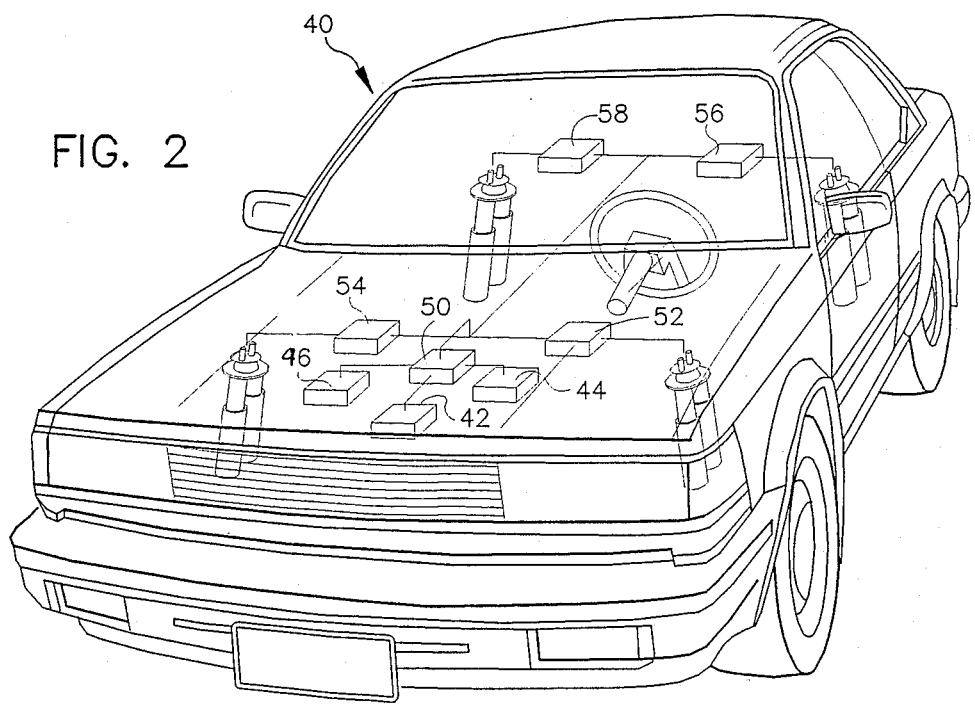
FIG. 2 is a perspective view schematically illustrating a system in accordance with the invention arranged in a conventional vehicle chassis.

Referring to FIG. 2 of the drawings, there is illustrated in schematic form an overall system for a typical passenger vehicle. The system comprises one or more sensors, such as for example a road condition sensor unit 42, a vehicle speed sensor unit 44 and acceleration or turning sensor 46. These sensors are connected to a central microprocessor (CPU) 50, which responds to signals from the sensors to alter or vary the spring rate of the variable springs 26 or the resistance of the damper 24 as required to provide an optimum ride. Other sensors, such as load and feedback sensors from each of the suspension units, particularly the active suspension units, also provide signals that feed back to the CPU 50. The CPU 50 then controls the active suspension units for each of the wheels, either in unison or individually as may be required through appropriate interface control units 52, 54, 56, and 58 for each of the active suspension units.

The overall system may include a sensing and control unit somewhat as disclosed for example in U.S. Pat. No. 4,616,848, which is incorporated herein by reference as though fully set forth. Other aspects of the active control system, such as for spring stiffness or height sensing may be such as disclosed in U.S. Pat. 4,616,847, issued Oct. 14, 1986 which is incorporated herein by reference as though fully set forth.

The road condition sensor 42 may for example be any one of a number of types of sensors, such as Sonic, Ultrasonic, Radar or other signal means, which senses for example the height of a portion of the vehicle above the road surface, thereby detecting and sensing changes in the road surface as the vehicle approaches. Changes in the suspension are then controlled by the CPU 50 in response to the sensing unit.

A pump, compressor or generator (not shown) is driven by the vehicle engine and provides pressurized fluid, compressed air or electronic energy, which is directed as needed to the active spring 26 for stiffening the springs or raising the vehicle as required. For example, if the vehicle goes into a turn, the accelerator sensor senses the change in direction and signals the CPU, which activates necessary valves to stiffen the springs on the outside of the turn. It will also act to activate restriction valves to stiffen the dampers on the outside of the turn. This will stabilize the vehicle by resisting its tendency to roll for the turn.

In a similar manner, the speed of the vehicle is a parameter, which may be taken into consideration for altering the stiffness of the springs, for example, to increase stability for high speeds. The acceleration of the vehicle and its change in direction, for example such as entering a curve or steering into a curve, will signal the CPU to alter the active spring characteristics to adjust for cornering of the vehicle. In a similar fashion, sensing units within the active spring units themselves sense the load of the vehicle and changes therein, and signals the CPU to again alter the spring characteristics to compensate for the load or change load.

The system is designed for example to accommodate a normal load, such as for example for a four passenger vehicle, the vehicle would be programmed to support the weight of four normal sized passengers of an average weight of one-hundred fifty to one-hundred sixty pounds for cruising over a normally straight and level road surface without activating the active suspension system. However, should an overweight or excess weight be applied to the vehicle, the active system may come into being to prevent excess lowering of the vehicle relative to the suspension system.

In a similar manner as the vehicle enters a rough road, or a highly curved road, the active system becomes activated and compensates for the dips and changes in road level, and for any changes in the vehicle speed, direction and road conditions. Thus, the system in its preferred form imposes a load on the vehicle engine only during other than normal driving conditions.

However, it is to be understood that an embodiment of the invention includes a version wherein the passive system may supply about one-half or more of the support and the active system supplies the remainder of the support for a normal load.

The system in its preferred form incorporates for example a source of compressed air, such as a compressor (not shown) operated from the vehicle engine, which supplies pressurized air, which is selectively fed to and bled from the active or variable air spring units of the suspension system by the control system as needed to compensate for various load and road conditions.

The system may also incorporate selective control means for selectively controlling the degree of the stiffness of the dampers or shock absorbers of the system, such that the damping may also be controlled in response to various road and load conditions to alter the stiffness or damping characteristics of the suspension in response to these conditions. As previously mentioned, alternative systems may provide controlled response as a function of hydraulic or electronic energy management.

It is contemplated that the present system in its preferred form will have a passive system, which will be operative for normal loads and road conditions with the active system being activated and engaged only in the case of deviations of the load and/or road conditions outside a certain predetermined range. This provides a system which is highly effective in maintaining the vehicle stability, yet at the same time is lightweight and inexpensive and does not drain excess energy from the vehicle power. Thus, a predominately passive system with a reactive active system is provided.

The system may also be varied such that the percent of support provided by the two systems may vary from being predominately passive as above described to only partially passive. Thus, the system can be constructed such that a selected or desired amount of the support may be provided by one or the other system so that it may be a predominately passive or a predominately active system.

In operation of a predominately passive system, such as may be installed on a four passenger automobile, which when loaded with a normal load, of for example four passengers of less than one hundred sixty pounds each, and operating at moderate to normal cruising on a smooth straight and level roadway will be described. As long as the vehicle remains at moderate speed and moving in a generally straight line, only the passive system of the vehicle suspension will be supporting the vehicle body relative to the wheels. When the vehicle enters a short radius turn, the sensing means of the active system will respond to the change in direction of the vehicle and to the tendency of the vehicle body to roll to become active and resist the roll of the body by increasing the resistance of the dampers and the spring rate of the variable rate springs on the outside of the turn.

The suspension system will react in a similar manner when the vehicle enters a stretch of rough road. The sensing means of the system will sense variations in the road surface and act to stiffen appropriate dampers and springs so as to resist the tendency of the vehicle to pitch or to roll. If a load greater than a normal load is place on the vehicle, the active system will come into action to increase the pressure in the variable springs in order to support the vehicle at its normal height.

Variable springs of air, hydraulic, or electronic, and combinations thereof of these are generally within the state of the art. Air and hydraulic springs would have means for varying the pressure and/or variable restriction to vary fluid flow. Electronic or electronic springs would have, for example, a linear motor configuration with means for varying the field for varying the resistance to movement and the like.

While I have illustrated and described my invention by means for specific embodiments, it is to be understood that numerous changes and modifications may be made therein without departing from the spirit and scope of the invention as defined in the appended claims.

I claim:

1. An automotive vehicle suspension system comprising:
    passive spring means including a combined composite arm and spring member for providing support for normal cruise conditions for a normal load on normal road conditions; and
    active spring means including a variable rate fluid spring and control means responsive to predetermined load and road conditions for varying the rate of said fluid spring.

2. A suspension system for an automotive vehicle according to claim 1 wherein:
    said active spring means comprises a variable hydraulic spring and a damper disposed in parallel.

3. A suspension system for an automotive vehicle according to claim 1 wherein:
    said active spring means comprises an air spring and sensing means for sensing road conditions and control means responsive to said sensing means for changing the spring rate of said air spring.

4. A suspension system for an automotive vehicle according to claim 3 wherein:
    said sensing means comprises first sensing means for sensing vehicle speed, second sensing means for sensing vehicle body height relative to a road surface.

5. An automotive vehicle suspension system comprising in combination:
    first suspension means including a combined composite control arm and spring member for providing support for normal load conditions for generally straight line cruise on normal road conditions; and
    second suspension means including a variable rate air spring and a variable rate damper disposed in parallel; and
    control means including sensing means for sensing changes in vehicle load conditions and control means responsive to said sensing means for changing at least one of the spring rate of said air spring and the damping rate of said damper.

6. An automotive vehicle suspension system according to claim 5 wherein:
    said sensing means includes means for sensing any one of load conditions, road surface conditions, and vehicle change of speed and/or direction.

7. An automotive vehicle suspension system according to claim 6 wherein:
    said control arm and spring member is fixed at an inner end and flexes over the length thereof.

8. An automotive vehicle suspension system according to claim 7 wherein:
    said control arm and spring member defines lower guidance and control means for a vehicle wheel assembly; and said variable rate spring and said variable rate damper defines upper guidance and control means for said wheel assembly.

9. A suspension system for an automotive vehicle comprising:
 first spring means providing a first portion of support or a vehicle body;
 second spring means responsive to variance in dynamic conditions of said vehicle body for providing a second portion of said support;
 said first spring means provides support for normal load for straight line cruise on normal road conditions;
 said second spring means comprises variable spring means and sensing means for sensing road conditions and control means responsive to said sensing means for changing the spring rate of said variable spring means.

10. A suspension system for an automotive vehicle according to claim 9 wherein:
 said first spring means is a composite member defining a combination spring and control arm.

11. A suspension system for an automotive vehicle according to claim 10 wherein:
 said second spring means comprises a variable rate electronic spring.

12. A suspension system for an automotive vehicle according to claim 10 wherein:
 said second spring means comprises a variable rate hydraulic spring.

13. A suspension system for an automotive vehicle according to claim 10 wherein:
 said second spring means comprises a variable rate air spring.

14. A suspension system for an automotive vehicle according to claim 10 wherein:
 said sensing means includes means for sensing any one of load conditions, road surface conditions, and vehicle change of speed and/or direction.

15. A suspension system for an automotive vehicle according to claim 14 wherein:
 said second spring means comprises a variable rate electronic spring.

16. A suspension system for an automotive vehicle according to claim 14 wherein:
 said second spring means comprises a variable rate hydraulic spring.

17. A suspension system for an automotive vehicle according to claim 14 wherein:
 said second spring means comprises a variable rate air spring.

* * * * *